(12) United States Patent
Pullan et al.

(10) Patent No.: US 11,326,459 B2
(45) Date of Patent: May 10, 2022

(54) BLADE FOR A GAS TURBINE ENGINE

(71) Applicant: ROLLS-ROYCE plc, London (GB)

(72) Inventors: Graham Pullan, Cambridge (GB); Andrew P. Melzer, Cambridge (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 16/748,840

(22) Filed: Jan. 22, 2020

(65) Prior Publication Data

US 2020/0256197 A1 Aug. 13, 2020

(30) Foreign Application Priority Data

Feb. 13, 2019 (GB) ..................................... 1901951

(51) Int. Cl.
*F01D 5/18* (2006.01)
*F01D 5/14* (2006.01)
*F04D 29/58* (2006.01)

(52) U.S. Cl.
CPC ............. *F01D 5/187* (2013.01); *F01D 5/145* (2013.01); *F04D 29/584* (2013.01); *F05D 2240/122* (2013.01); *F05D 2240/304* (2013.01); *F05D 2250/71* (2013.01); *F05D 2250/711* (2013.01); *F05D 2250/712* (2013.01); *F05D 2260/40311* (2013.01)

(58) Field of Classification Search
CPC .......... F01D 5/145; F01D 5/186; F01D 5/187; F05D 2250/71; F05D 2250/711; F05D 2250/712; F05D 2260/20; F05D 2260/202; F05D 2240/122; F05D 2240/304; F05D 2260/40311; F04D 29/584; F04D 29/5846
See application file for complete search history.

(56) References Cited

U.S. PATENT DOCUMENTS

| 6,328,531 | B1 * | 12/2001 | Bariaud | F01D 5/187 |
| | | | | 416/97 R |
| 6,709,237 | B2 * | 3/2004 | Tiemann | B23P 15/02 |
| | | | | 29/882 |
| 2011/0293422 | A1 * | 12/2011 | Gupta | F01D 5/145 |
| | | | | 416/95 |
| 2013/0331222 | A1 * | 12/2013 | Richards | F16H 1/28 |
| | | | | 475/331 |

(Continued)

FOREIGN PATENT DOCUMENTS

| EP | 2703600 | 3/2014 |
| EP | 3231996 | 10/2017 |

OTHER PUBLICATIONS

Great Britain search report dated Aug. 16, 2019, issued in GB Patent Application No. 1901951.2.

*Primary Examiner* — Christopher Verdier
(74) *Attorney, Agent, or Firm* — Barnes & Thornburg LLP

(57) ABSTRACT

A blade for a gas turbine engine comprises an aerofoil body having a suction side, a pressure side, and a trailing edge. An internal cooling passageway is provided in the aerofoil body, and an ejection slot in fluid communication with the cooling passage and provided at the trailing edge of the aerofoil body. The ejection slot is defined between a pressure side wall and a suction side wall. Both the suction side wall and the pressure side wall include a mid-section and a trailing edge section adjacent the mid-section, and the thickness of the suction side wall and the pressure side wall reduces to define a taper with a wedge angle less than or equal to 20 degrees.

8 Claims, 6 Drawing Sheets

(56) References Cited

U.S. PATENT DOCUMENTS

| | | | |
|---|---|---|---|
| 2014/0106922 A1* | 4/2014 | Hancox | F02C 7/36 |
| | | | 475/159 |
| 2016/0208620 A1* | 7/2016 | Thistle | F01D 5/187 |
| 2017/0211393 A1* | 7/2017 | Wong | F01D 25/12 |
| 2019/0226343 A1* | 7/2019 | LoRicco | F01D 9/041 |

* cited by examiner

BLADE FOR A GAS TURBINE ENGINE

CROSS-REFERENCE TO RELATED APPLICATIONS

This application is based upon and claims the benefit of priority from UK Patent Application Number 1901951.2 filed on 13 Feb. 2019, the entire contents of which are incorporated herein by reference.

BACKGROUND

Technical Field

The present disclosure relates to a blade for a gas turbine engine and/or a gas turbine engine.

Description of the Related Art

Turbines of gas turbine engines operate at high temperatures and the turbine blades are often cooled using air flow that is cooler than the flow of air through the turbine, for example air bled from the compressor may be used to cool the turbine blades. It is common for turbine blades to include one or more internal cooling passages to cool the turbine blade. In some designs of turbine blades a series of ejection slots are provided at the trailing edge of the blade. Flow from the internal cooling passage can flow, in use, through the ejection slots to cool the trailing edge of the blade.

It is desirable to optimise the efficiency of a gas turbine engine, and this includes minimising any efficiency losses in the turbine.

SUMMARY

According to a first aspect there is provided a blade for a gas turbine engine. The blade comprises an aerofoil body having a suction side, a pressure side, and a trailing edge. The blade further comprises an internal cooling passageway provided in the aerofoil body and an ejection slot in fluid communication with the cooling passage and provided at the trailing edge of the aerofoil body. The ejection slot is defined between a pressure side wall and a suction side wall. Both the suction side wall and the pressure side wall include a mid-section and a trailing edge section adjacent the mid-section, and wherein the thickness of the trailing edge section of the suction side wall and the pressure side wall reduces to define a taper with a wedge angle less than or equal to 20 degrees. The thickness of the trailing edge section reduces such that internal and external gas washed surfaces of the trailing edge sections have continuous curvature at least at a transition from the mid-section to the trailing edge section and in a region that extends from the transition between the mid-section and the trailing edge section to a position where the trailing edge section has a thickness half that of the maximum thickness of the trailing edge section. Continuous curvature is defined as a constant curvature or a curvature that changes gradually.

The mid-section of the pressure side wall and/or the suction side wall may have constant thickness. Alternatively, the mid-section of the pressure side wall and/or the suction side wall may have constant thickness for at least a portion adjacent the trailing edge section.

The entire gas washed surface of the trailing edge section may have continuous curvature. That is, the continuous curvature may extend from the transition with the mid-section on the internal gas washed surface, along the internal gas washed surface to a trailing edge of the trailing edge section, to the external gas washed surface and to the transition with the mid-section on the external gas washed surface.

The maximum thickness of the trailing edge section of the suction side wall and/or the pressure side wall may be at least 5% of the width of the ejection slot measured in a thickness direction of the blade.

A downstream most point of the trailing edge of the suction side wall may be chordally offset from the downstream most point of the trailing edge section of the pressure side wall.

The downstream most point of the trailing edge section of the suction side wall may be chordally aligned with the downstream most point of the trailing edge section of the pressure side wall.

The trailing edge section may comprise surfaces having only convex curvature.

The trailing edge section may comprise surfaces having both a concave and a convex curvature.

The blade may be a turbine blade. The blade may be a compressor blade. The blade may be a shrouded blade or an unshrouded blade for example the blade may have a squealer or winglet tip.

In an aspect there is provided a gas turbine engine comprising the blade according to the previous aspect.

In an aspect there is provided a gas turbine engine for an aircraft comprising an engine core comprising a turbine, a compressor, and a core shaft connecting the turbine to the compressor. A fan is located upstream of the engine core, the fan comprising a plurality of fan blades. The gas turbine engine further comprises a gearbox that receives an input from the core shaft and outputs drive to the fan so as to drive the fan at a lower rotational speed than the core shaft. The turbine and/or the compressor comprise a blade according to the previous aspect.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminum based material (such as an aluminum-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminum based body (such as an aluminum lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
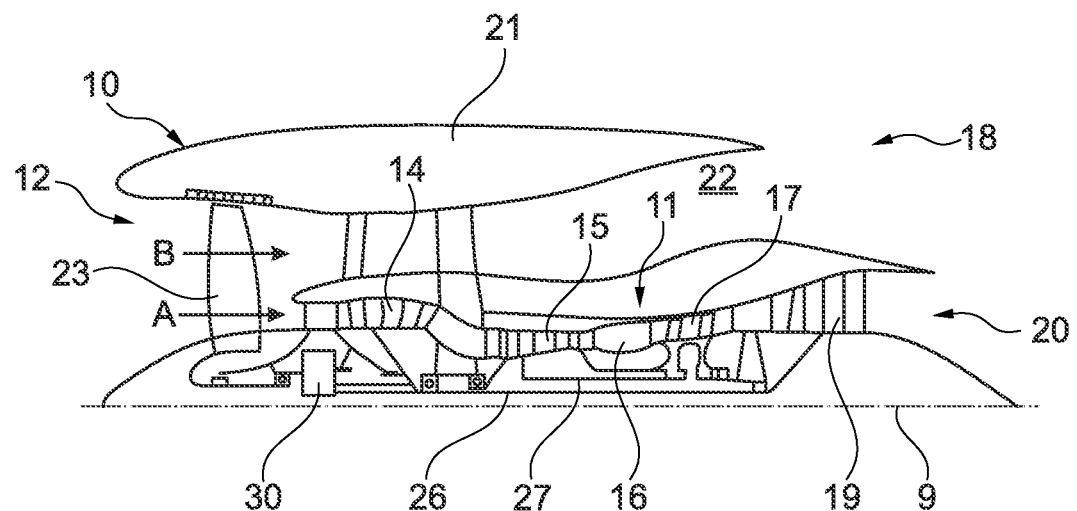
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
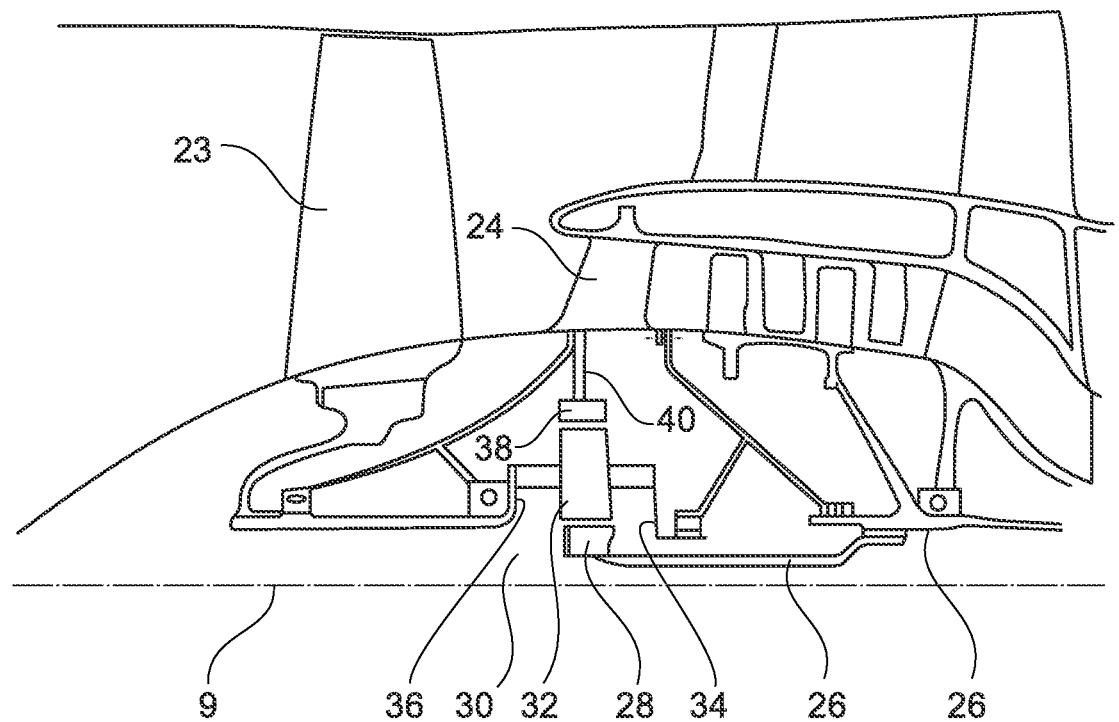
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
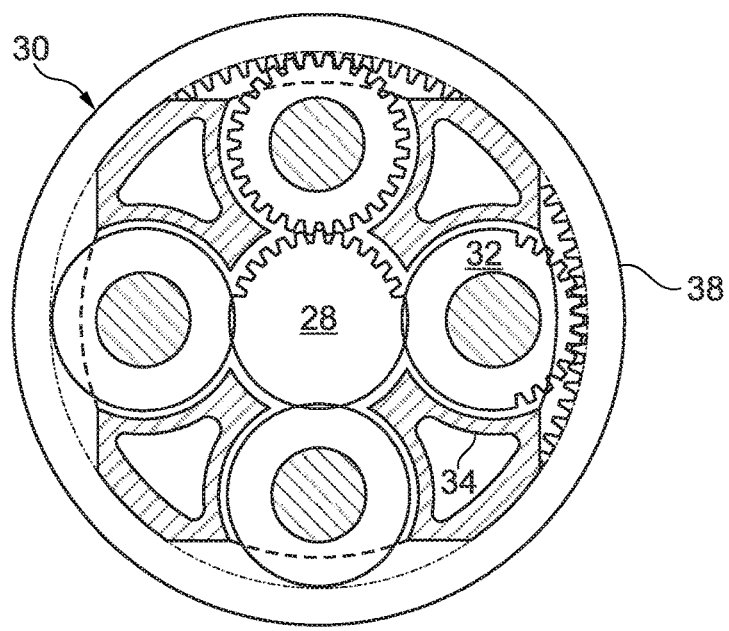
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figures 4A, 4B:
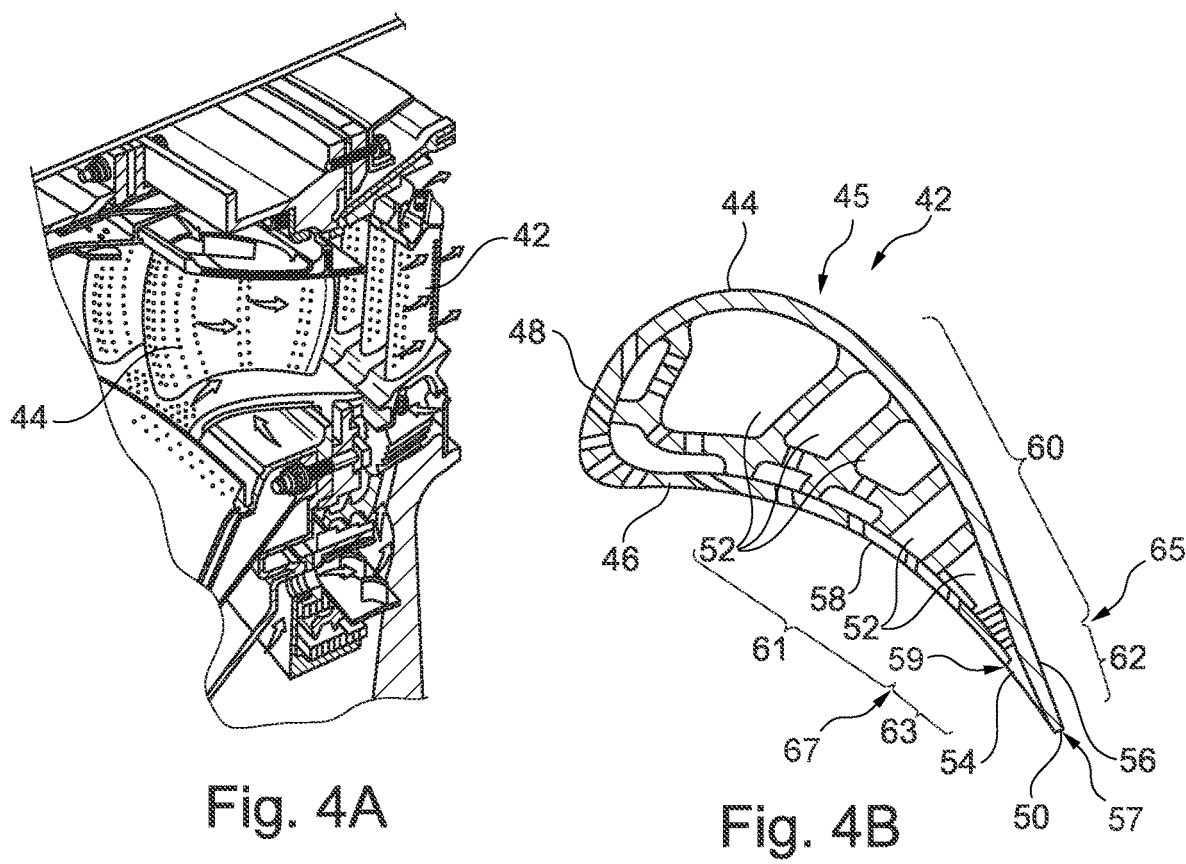
FIG. 4A is a perspective view of a nozzle guide vane and a turbine blade.
FIG. 4B is a sectional plan view of a turbine blade.

Referring to FIG. 4A, a turbine blade 42 is shown. The turbine blade 42 may be used in the high pressure turbine 15, alternatively it may be used in the low pressure turbine 19. In this example, the turbine blade is provided downstream of a nozzle guide vane 44. The turbine blade of this example is a shrouded blade, but in alternative examples the turbine blade may be unshrouded. When the turbine blade is unshrouded it may have a squealer or winglet tip.

Referring to FIG. 4B, the turbine blade has an aerofoil body 45 with a suction side 44, a pressure side 46, a leading edge 48 and a trailing edge 50. In the present disclosure, a chordal direction extends from the leading edge to the trailing edge and a thickness direction extends from the pressure side to the suction side.

A plurality of internal cooling passages 52 are provided in the aerofoil body 45. An ejection slot 54 is provided at a trailing edge of the aerofoil body 45 and is defined between a suction side wall 56 and a pressure side wall 58. The ejection slot is in fluid communication with the cooling passages. In this example, an inlet to the ejection slot is coincident with an outlet of one of the cooling passages. Coolant (usually air) from the cooling passages flows through the ejection slot to cool the trailing edge of the blade.

The suction side wall and the pressure side wall can be considered to have a mid-section 60, 61 and a trailing edge section 62, 63. The trailing edge section is adjacent to the mid-section and downstream of the mid-section. The trailing edge sections are proximal to the trailing edge of the aerofoil body 45. As will now be described, the trailing edge section tapers and the transition 65, 67 between the mid-section and the trailing edge section is the point at where the taper begins.

Figure 5:
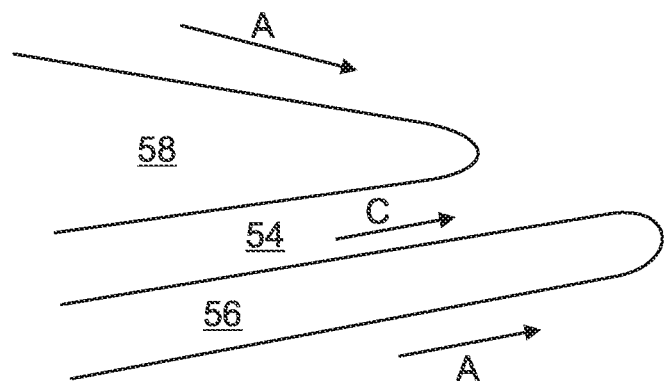
FIG. 5 is a sectional plan view of a trailing edge section of a turbine blade.

Referring now to FIG. 5 a trailing edge section of the present disclosure is shown. As can be seen in FIG. 5, an external surface of the suction side wall 56 and the pressure side wall 58 is gas washed by a flow A of air through the turbine, and an internal surface of the suction side wall and the pressure side wall is gas washed by a flow C of coolant along the ejection slot 54.

Figure 6:
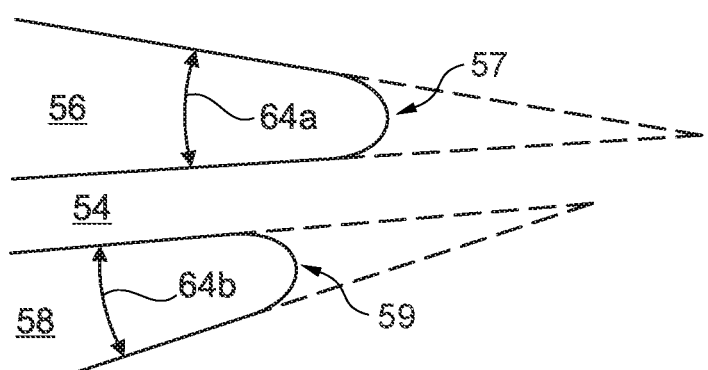
FIG. 6 is a sectional plan view of a trailing edge section of a turbine blade illustrating the taper and wedge angle of the suction side and pressure side walls in the trailing edge section.

In the region of the trailing edge section, the suction side wall 56 and the pressure side wall 58 both have a thickness that reduces in a direction towards the trailing edge of the aerofoil body 45 so as to define a taper. The taper and associated wedge angle is illustrated in FIG. 6. The wedge angle 64a, 64b is less than or equal to 20 degrees. The wedge angle is the angle between two lines, one on an internal side and one on the external side of the respective pressure or suction side wall, that are drawn tangent to the thickest part of the trailing edge section. As shown in FIGS. 4B and 6, each of the pressure side wall 58 and the suction side wall 56 define an internal gas washed surface and an external gas washed surface that meet at a terminal end 57, 59.

Figure 7:
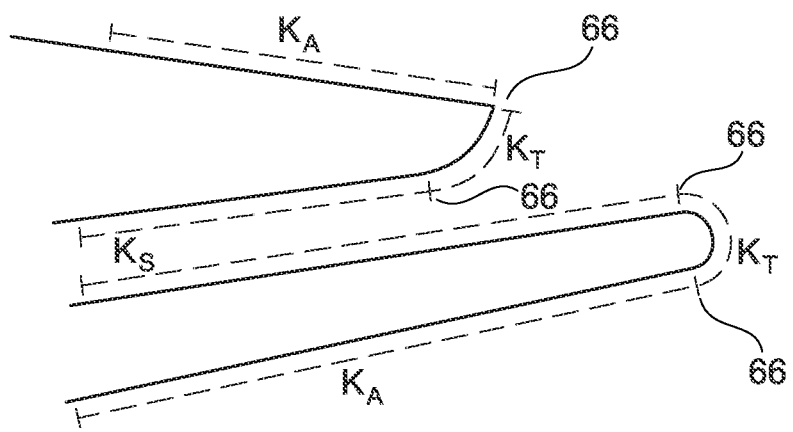
FIG. 7 is a sectional plan view of a trailing edge section of a turbine blade related to this disclosure.

The internal and external gas washed surfaces of the trailing edge section are curved. The entirety of the curvature of the gas washed surfaces in the trailing edge section is continuous. That is, there is a gradual change in radius between the mid-section and the trailing edge section and also within the trailing edge section the curvature is either gradually changing or constant. This can be explained further by comparing the trailing edge section of FIG. 5 with the trailing edge section of FIG. 7, which illustrates an example of a trailing edge section where there is an abrupt change in curvature in the outermost quarters of the trailing edge section, where quarters are defined in the thickness direction and one outer quarter is adjacent the ejection slot and the other outer quarter is adjacent the flow through the turbine. In FIG. 7 it can be seen that there is an abrupt change in curvature at points 66 between the blade surface curvature $K_A$ and an end region of the walls which in this case have constant curvature $K_T$, and there is an abrupt change in curvature at points 66 between the slot surface curvature $K_S$ and an end region of the walls which in this case have constant curvature $K_T$. This abrupt change in curvature is eliminated in the blade of the present disclosure as illustrated in FIG. 5.

Figure 8:
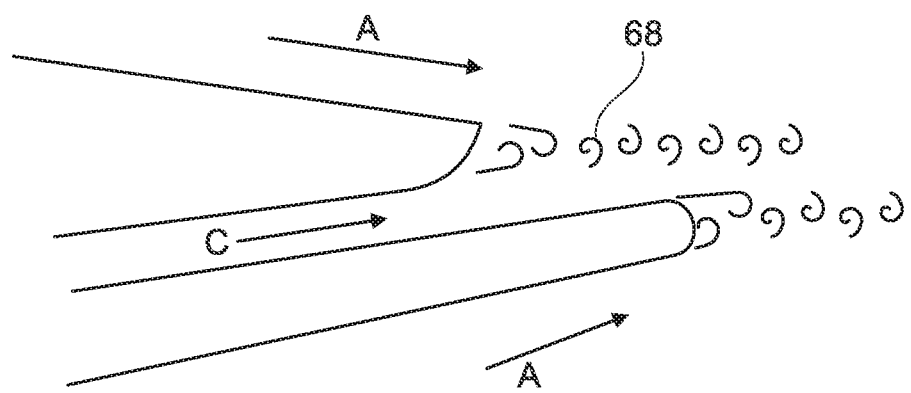
FIG. 8 is a sectional plan view of a trailing edge section of a turbine blade showing the flow of air along the gas washed surfaces of the trailing edge section of a blade related to this disclosure.
Figure 9:
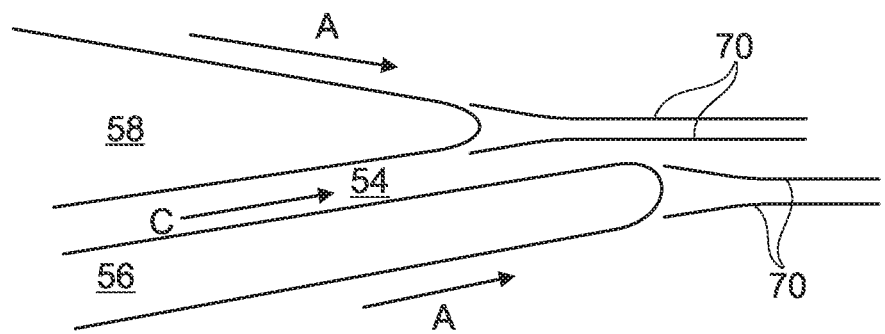
FIG. 9 is a sectional plan view of a trailing edge section of a turbine blade showing the flow of air along the gas washed surfaces of the trailing edge section.

Referring to FIG. 8, when there is an abrupt change in curvature as in the profile shown in FIG. 7, there are unsteady edge separations of the flow A through the turbine and flow C through the ejection slot that result in vortex shedding and the vortices 68 (only one labeled for clarity) generate losses. Referring to FIG. 9, the provision of blades with continuous curvature in the trailing edge section of the suction side wall 56 and the pressure side wall 58 can improve the efficiency of a turbine by supressing vortex formation in the wake of the blade, as illustrated by flow lines 70. Similar to previous figures, the flow along the blade and through the turbine is illustrated by arrow A and the flow through the ejection slot 54 is illustrated by arrow C.

Figure 10:
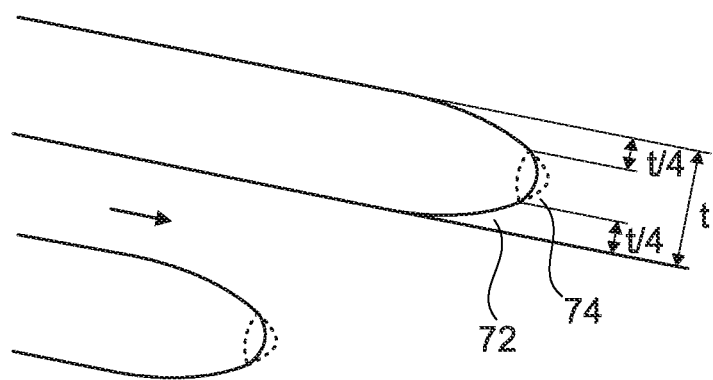
FIG. 10 is a sectional plan view of a trailing edge section of a turbine blade illustrating the minimal region of constant curvature.

It will be appreciated by the person skilled in the art that the shape of the trailing edge section of the suction side wall and the pressure side wall can be modified whilst achieving the above described benefits. For example, in the embodiment described above the entirety of the gas washed surface of the trailing edge section has continuous curvature, but in alternative embodiments a portion of the trailing edge section may not have continuous curvature. Referring to FIG. 10, in such alternative embodiments, the portion 74 without continuous curvature is at a downstream most end. In such embodiments, the flanks of the trailing edge section have continuous curvature and there is continuous curvature from the mid-section to the trailing edge section. The flanks 72 in this example are provided on the outer quarters of the trailing edge section, or in other words in a portion of the trailing edge section corresponding to one quarter (t/4) of the thickness t of the trailing edge section. Continuous curvature along the flanks (and the transition from the mid-section to the flanks/trailing edge section) encourages boundary layers on both the inner and outer gas washed surfaces of the trailing edge section to remain attached around the trailing edge of the blade. The shape of the flow inside the region of separation is of less importance, meaning that the portion 74 can have non-continuous curvature whilst still achieving benefits of the present disclosure.

Figure 11:
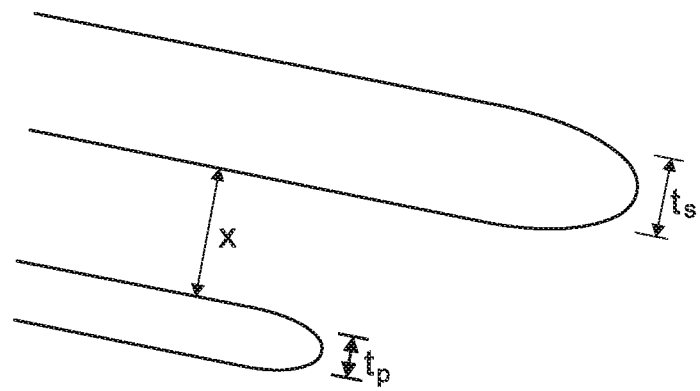
FIG. 11 is a sectional plan view of a trailing edge section of a turbine blade illustrating the maximum width of the ejection slot.

Referring to FIG. 11, the inventors have found that the benefits of the present disclosure are greatest when the maximum thickness ($t_s$) of the suction side trailing edge section and the maximum thickness ($t_p$) of the pressure side trailing edge section is greater than 5% of the thickness (x) of the ejection slot. The thickness is measured in a direction from the pressure side to the suction side and is perpendicular to the inner suction side wall. The thickness of the ejection slot is measured proximal to an outlet of the ejection slot at a transition between the mid-section and the trailing edge section of the pressure side wall (or the suction side wall if the transition from the mid-section to the trailing edge section is more upstream on the suction side wall than on the pressure side wall).

Figure 12:
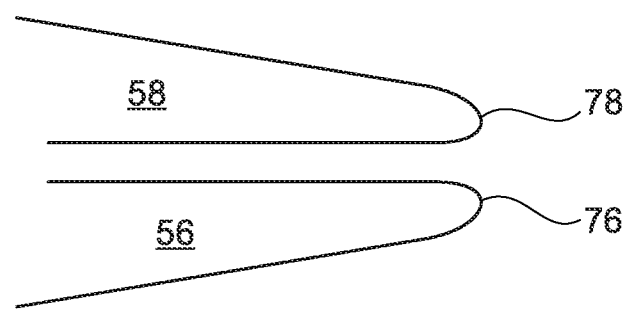
FIG. 12 is an alternative sectional plan view of a trailing edge section of a turbine blade.
Figure 13:
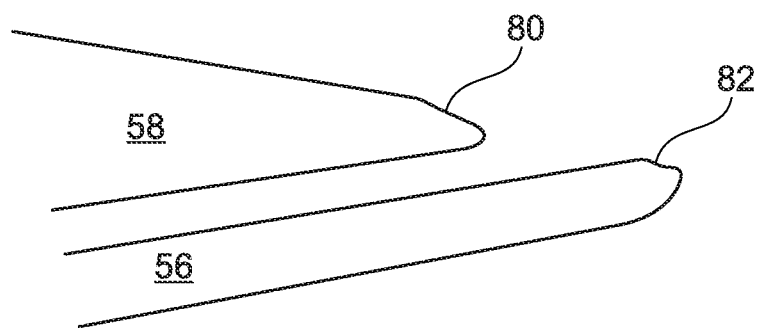
FIG. 13 is a further alternative sectional plan view of a trailing edge section of a turbine blade.

Referring now to FIG. 12, an alternative trailing edge section of a turbine blade is shown. In the previously described example, the trailing edge of the pressure side wall 58 was offset downstream of the suction side wall 56. However, in the embodiment of FIG. 12 the trailing edge 76 of the suction side wall is axially (or chordally) aligned with the trailing edge 78 of the pressure side wall. A further alternative trailing edge section of a turbine blade is shown in FIG. 13. In this example, the entirety of the trailing edge section of the suction side and pressure side walls has continuous curvature but the curvature includes both convex and concave curvature. In this example a convex portion 80, 82 is provided on both the pressure side wall 58 and the suction side wall 56. FIG. 13 also illustrates that the trailing edge section of the suction side wall may have different curvature to the trailing edge section of the pressure side wall.

The described examples relate to turbine blades, but the features of the present disclosure are also applicable to other types of cooled blades or vanes (static or rotating), for example compressor blades.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A blade for a gas turbine engine, the blade comprising:
   an aerofoil body having a suction side, a pressure side, and a trailing edge;
   an internal cooling passageway provided in the aerofoil body; and
   an ejection slot in fluid communication with the cooling passage and provided at the trailing edge of the aerofoil body;
   wherein the ejection slot is defined between a pressure side wall and a suction side wall; and
   wherein both the suction side wall and the pressure side wall include a mid-section and a trailing edge section adjacent the mid-section, and wherein each of the suction side wall and the pressure side wall has a thickness that reduces in a direction toward the trailing edge beginning at a transition from the mid-section to the trailing edge section to define a taper with a wedge angle equal to 20 degrees;
   wherein each of the pressure side wall and the suction side wall define an internal gas washed surface and an external gas washed surface that meet at a terminal end of the trailing edge section;

wherein the thickness of the pressure side wall and the thickness of the suction side wall each reduces such that the internal and external gas washed surfaces of the trailing edge sections have continuous curvature beginning at the transition from the mid-section to the trailing edge section and extending to the terminal end of the trailing edge sections and the thickness of the trailing edge sections reduces to half that of a maximum thickness of the trailing edge section;

wherein the continuous curvature of the internal and external gas washed surfaces of the trailing edge sections has a portion with a smallest radius of curvature at the terminal end of the trailing edge section, the portion is spaced apart from the internal and external gas washed surfaces by one quarter of the thickness of the pressure side wall and one quarter of the thickness of the suction side wall; and wherein the continuous curvature is defined as a constant curvature or a curvature that changes gradually.

2. The blade according to claim 1, wherein the maximum thickness of the trailing edge section of the suction side wall and/or the pressure side wall is at least 5% of the width of the ejection slot measured in a thickness direction of the blade.

3. The blade according to claim 1, wherein the terminal end of the trailing edge of the suction side wall is chordally offset from the terminal end of the trailing edge section of the pressure side wall.

4. The blade according to claim 1, wherein the terminal end of the trailing edge section of the suction side wall is chordally aligned with the terminal end of the trailing edge section of the pressure side wall.

5. The blade according to claim 1, wherein the blade is a turbine blade.

6. A gas turbine engine comprising the blade according to claim 1.

7. The blade according to claim 1, wherein the concave curvature is adjacent the terminal end of the trailing edge section.

8. The blade according to claim 1, wherein each terminal end of the trailing edge sections has both a concave and a convex curvature when viewed in a radial direction relative to an axis of the gas turbine engine.

* * * * *